United States Patent [19]

Papadakis

[11] 4,263,516
[45] Apr. 21, 1981

[54] BREAKWATER AND POWER GENERATOR

[76] Inventor: George M. Papadakis, 12 Angello Ter., Grover City, Calif. 93433

[21] Appl. No.: 37,762

[22] Filed: May 10, 1979

[51] Int. Cl.³ ............................................. G03B 13/12
[52] U.S. Cl. .......................................... 290/53; 60/502
[58] Field of Search ..................... 290/42, 43, 53, 54; 60/502, 505, 506, 639, 640; 405/21, 26–28, 30, 31, 34, 35

[56] References Cited

U.S. PATENT DOCUMENTS

| | | | |
|---|---|---|---|
| 1,507,461 | 9/1924 | Chase | 405/26 |
| 3,983,404 | 9/1976 | Sherrard | 290/53 |
| 4,078,871 | 3/1978 | Perkins, Jr. | 290/53 |

Primary Examiner—J. V. Truhe
Assistant Examiner—Shelley Wade
Attorney, Agent, or Firm—Flehr, Hohbach, Test

[57] ABSTRACT

A breakwater for breakwater for breaking the force of waves to protect harbors and beaches and generating electrical power from the waves. The breakwater includes a sloped front wall so that the waves break upwardly along the wall. One or more passages extend through the breakwaver to a lower elevation on the harbor side. Paddle wheels or turbines are disposed in said passages. The force of the waves drives water through said passages and the receding water falling down the face of the wall flows through said passages to provide power to drive the paddle wheel or turbine which, in turn, is connected to drive a generator.

10 Claims, 4 Drawing Figures

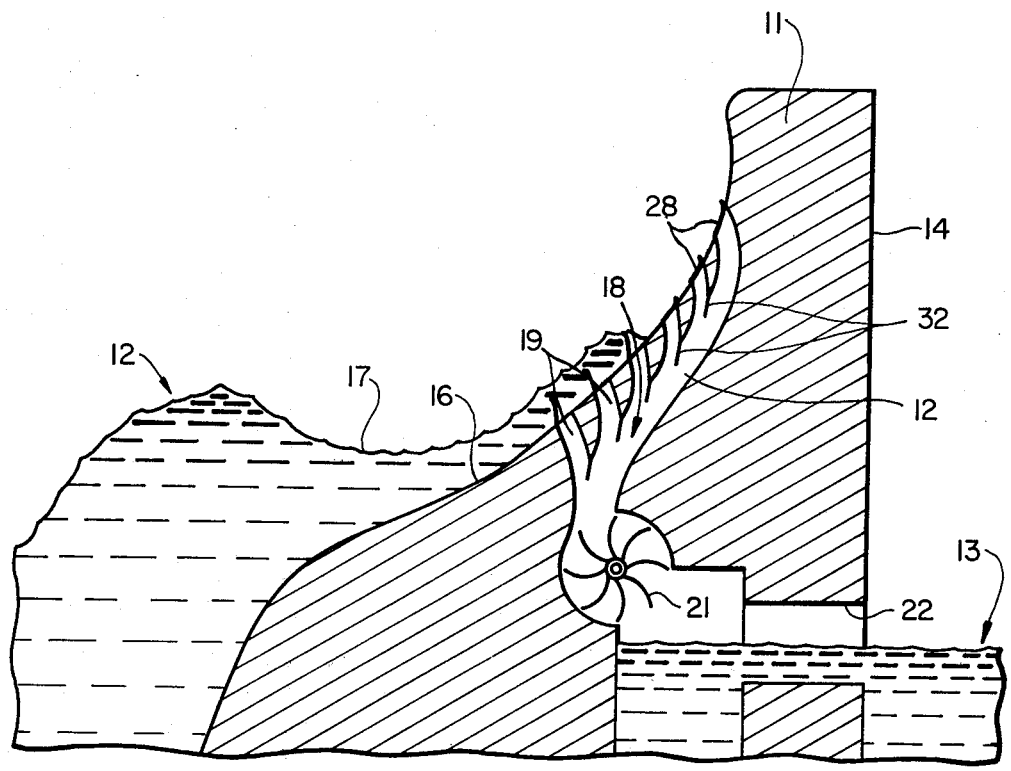
FIG_1
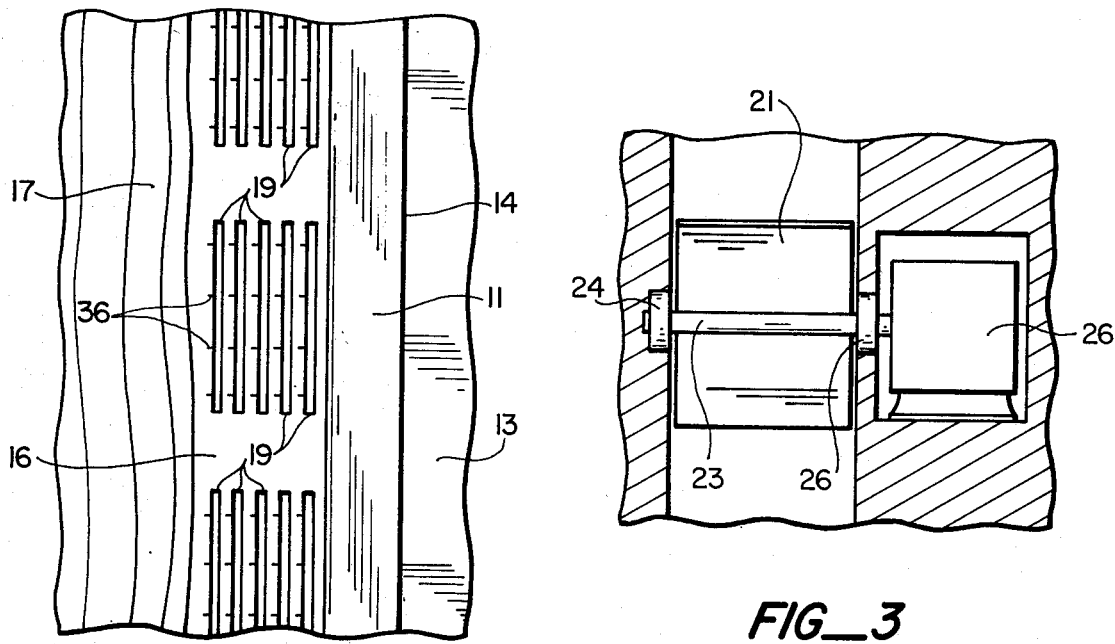
FIG_2
FIG_3

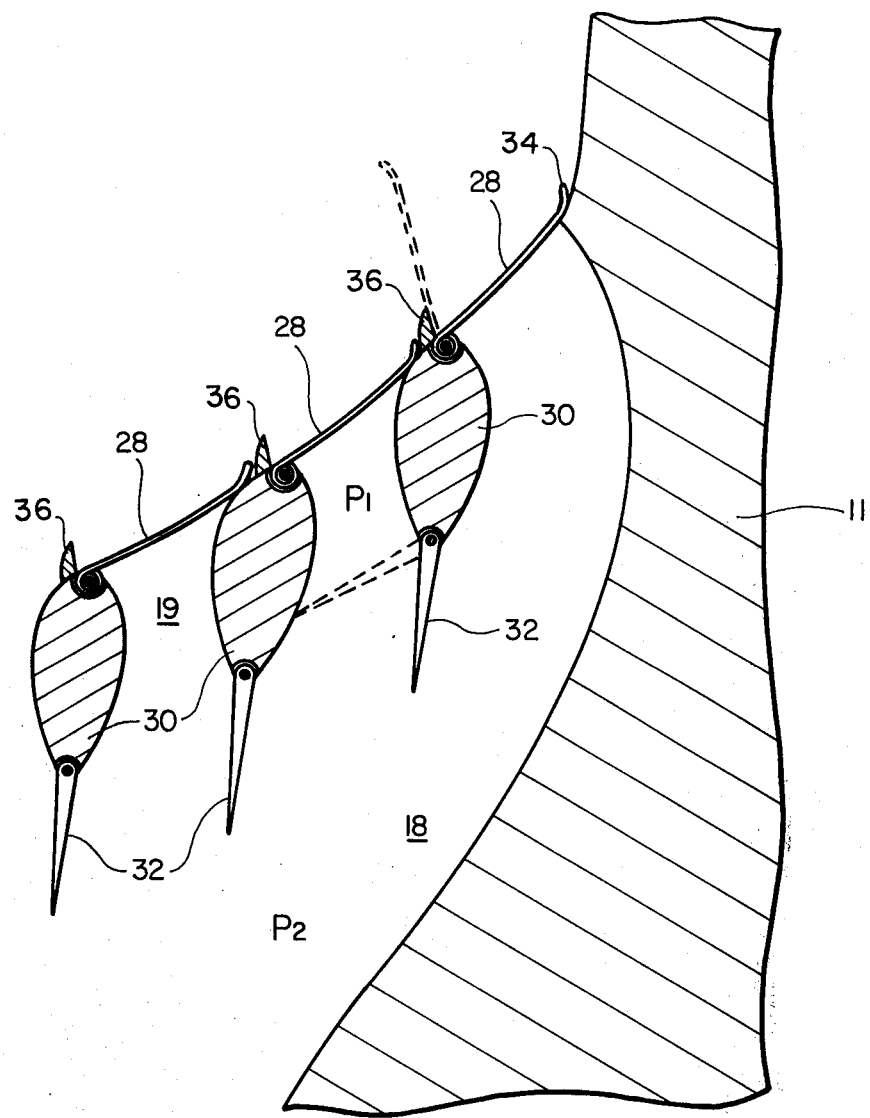
FIG_4

BREAKWATER AND POWER GENERATOR

This invention relates generally to a breakwater for protecting beaches and harbors and a power generator for producing electrical power from the energy of the waves.

Many harbors can be improved with the provision of a breakwater which dissipates the wave energy. The wave energy, if it can be harnessed, can be used to produce cheap power. In the past, attempts have been made to harness the power. Among these are wave power generators which employed floats which moved up and down to drive generators. Other included paddle wheels driven by the waves as they break onto shore and receded therefrom. These prior art systems have been complex and susceptible to storm damage.

In view of the large need for the protection of coastal land and the provision of harbors for pleasure boats and other water recreation, there is a need for breakwaters. In many areas breakwaters have been constructed to dissipate the wave energy and provide harbors.

It is a general object of the present invention to provide a breakwater which includes means for harnessing the wave energy to generate power.

It is a further object of the present invention to provide a breakwater in which the wave energy is used to drive a turbine or paddle wheel disposed in passages which communicate between the front and rear of the breakwater.

It is a further object of the present invention to provide a breakwater and power generator in which the wave kinetic energy is transformed to potential energy which is employed to generate power.

Another object of the invention is a breakwater which minimizes the generation of reflected waves back toward the open sea.

Yet another object of the invention is a breakwater which provides a smooth flow of water from outside of a harbor into the harbor to displace polluted harbor water.

The foregoing and other objects of the invention are achieved by a breakwater which includes a sloping front wall for dissipating the force of the waves and causing the waves to travel upwardly along the wall. At least one passage is formed in the breakwater and has one end opening which is covered by a retractable flap. As the wave falls the flap is opened and water flows into the wall end of the passage whereby the potential energy in the receding waves causes water to travel through the passsage. A rotatable paddle wheel or turbine is displaced in the passage and serves to be rotated by the captured kinetic and potential energy of the waves. The paddle wheel is connected to a suitable electrical generator for generating electrical power.

FIG. 1 is a sectional view of a breakwater in accordance with the present invention.

FIG. 2 is a top view of the breakwater shown in FIG. 1.

FIG. 3 is a rear elevational view of the breakwater shown in FIG. 1 partly cut away to show the paddle wheel and generator.

FIG. 4 is an enlarged sectional view of a portion of the breakwater shown in FIG. 1.

Referring to FIGS. 1 and 2, the breakwater 11 is shown with the ocean on the side 12 and a harbor on the side 13. The breakwater includes a substantially vertical back wall 14 and a sloping front wall 16 which faces the ocean and is adapted to receive the waves 17. As a wave strikes the front wall of the breakwater it travels upwardly along the slanting face to convert the kinetic energy to potential energy in the head which is developed. Thereafter, as the wave recedes the potential energy is converted to head and the kinetic energy developed therefrom drives the water harnessed to produce electrical energy.

In accordance with the present invention, the breakwater includes a plurality of passages 18 disposed along the wall with each of the passages 18 terminating in one or more sub-passages 19 which communicate with the front wall 16 of the breakwater. A paddle wheel 21 is disposed at the bottom of the passage 18 with the other end of the passage communicating with the passage 22 which opens into the harbor side at a lower elevation. Water discharging downwardly through the passage 18 is discharged into the harbor after energizing and rotating the paddle wheel. Retractable flaps 28 and 32 are provided with each sub-passage 19, as will be described below with reference to FIG. 4.

Referring more specifically to FIG. 3, the paddle wheel 21 is shown mounted on a shaft 23 which is journaled at its end in suitable bearings 24. The shaft extends outwardly past the bearing 24 and is connected to a generator 26 to drive the generator rotor and thereby convert the mechanical energy of rotation of the paddle wheel to electrical energy.

Referring to FIG. 4, an enlarged sectional view of a portion of the breakwater of FIG. 1 is shown. The sub-passages 19 are defined by gills 30 on the breakwater's front wall. The gills are hydrodynamically designed to allow smoother entry of water into the sub-passages 19 and the main passageway 18. Flaps 28 are rotatably mounted and are shown in a closed position for receiving an incoming wave. After the kinetic energy of the wave is converted to potential energy of the head of water on the breakwater, the downward flow catches the curved lip 34 of each flap 28, and flaps 28 are rotated to an open position (shown dotted) to receive the downward flow of water. Stationary preventor members 36 limit the travel of flaps 28, and after a wave recedes, the flaps 28 fall back to the closed position. Each preventor 36 is embedded in a gill 30 with a triangularly shaped blade portion extending from the gill for limiting the travel of a flap 28.

P1 and P2 indicate pressures created by the head of water inside of the sub-passages 19 and main passage 18, respectively. When P1 is greater than P2, flaps 32 which are rotatably mounted on gills 30 at the opening of the sub-passages into the main passage, are in an open position, as shown. However, when back pressure developed and P2 is greater than P1, flaps 32 close (shown dotted) and prevent backflow. Thus, all water received by the sub-passages is eventually directed to drive the turbine.

Thus, it is seen that there has been provided an improved breakwater and energy conversion system. While the invention has been described with reference to a specific embodiment, the description is illustrative and is not to be construed as limiting the invention. Various modifications and applications may occur to those skilled in the art without departing from the true spirit and scope of the invention as defined by the appended claims.

What is claimed is:

1. A breakwater and power generator comprising a breakwater disposed to protect a harbor from wave action said breakwater including a sloping wall facing the ocean whereby the water from the waves strikes the wall and flows upwardly along the wall, at least one passage formed in said breakwater and having one end opening at said wall and its other end into said harbor, whereby water flows from the ocean side to the harbor side in response to the waves, an electric generator, means in said passage serving to drive said generator responsive to water flowing through said passage and closure means mounted to said sloping wall in association with said passage whereby said passsage is closed when a wave strikes said wall and said passage is open when water flows downwardly along said wall.

2. A breakwater and power generator as in claim 1 in which said passage at said sloping wall is disposed to capture the water receding downwardly along the wall.

3. A breakwater and power generator as defined by claim 1 wherein said means for driving said generator comprises a rotatable paddle wheel.

4. A breakwater and power generator as defined by claim 1 wherein said closure means comprises a rotatable flap.

5. A breakwater and power generator as defined by claim 4 and further including a second rotatable flap within said passage which closes to prevent water within said passage from flowing backward when pressure within said passage exceeds pressure at the wall opening of said passage.

6. A breakwater and power generator as defined by claim 1 and further including a second closure means within said passage which prevents backflow of water in said passage.

7. A breakwater and power generator as defined by claim 1 wherein said passage includes a plurality of sub-passages having end openings at said wall, said sub-passages being defined by gill portions of said wall.

8. A breakwater and power generator as defined by claim 7 wherein second closure means is provided with each sub-passage which closes to prevent backflow of water in each sub-passage.

9. A breakwater and power generator comprising a breakwater disposed to protect a harbor from wave action said breakwater including a sloping wall facing the ocean whereby the water from the waves strikes the wall and flows upwardly along the wall, at least one passage formed in said breakwater and having one end opening at said wall and its other end into said harbor, whereby water flows from the ocean side to the harbor side in response to the waves, an electric generator, and means in said passage serving to drive said generator responsive to water flowing through said passage, said passage including a plurality of sub-passages having end openings at said wall, said sub-passages being defined by gill portions of said wall, each of said openings including closure means whereby said openings are closed when a wave strikes said wall and said openings are open when water flows downwardly along said wall.

10. A breakwater and power generator as defined by claim 9 wherein second closure means is provided with each sub-passage which closes to prevent backflow of water in each sub-passage.

* * * * *